United States Patent
Ma et al.

(10) Patent No.: US 12,530,029 B2
(45) Date of Patent: Jan. 20, 2026

(54) SYSTEM AND METHOD OF ADAPTIVE, REAL-TIME VEHICLE SYSTEM IDENTIFICATION FOR AUTONOMOUS DRIVING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/931,435

(22) Filed: Sep. 12, 2022

(65) Prior Publication Data

US 2023/0084702 A1    Mar. 16, 2023

Related U.S. Application Data

(60) Provisional application No. 63/243,009, filed on Sep. 10, 2021, provisional application No. 63/366,738, filed on Jun. 21, 2022.

(51) Int. Cl.
G05D 1/00    (2024.01)

(52) U.S. Cl.
CPC ......... G05D 1/0088 (2013.01); G05D 1/0212 (2013.01)

(58) Field of Classification Search
CPC .......................... G05D 1/0088; G05D 1/0212
See application file for complete search history.

(56) References Cited

U.S. PATENT DOCUMENTS

| | | | | |
|---|---|---|---|---|
| 10,146,225 | B2* | 12/2018 | Ryan | G06N 3/08 |
| 2008/0133066 | A1* | 6/2008 | Takenaka | B62D 6/003 |
| | | | | 701/1 |
| 2018/0089911 | A1* | 3/2018 | Rath | G07C 5/0808 |
| 2018/0114436 | A1* | 4/2018 | Felix | G05D 1/0088 |
| 2018/0154899 | A1* | 6/2018 | Tiwari | B60W 50/082 |
| 2018/0244271 | A1* | 8/2018 | Krueger | B60W 60/00182 |
| 2019/0016331 | A1* | 1/2019 | Carlson | G05D 1/0088 |
| 2019/0080602 | A1* | 3/2019 | Rice | B60H 1/0073 |
| 2019/0113920 | A1* | 4/2019 | England | G05D 1/0274 |
| 2019/0318050 | A1* | 10/2019 | Zapolsky | G06F 30/20 |
| 2019/0322308 | A1* | 10/2019 | Adachi | B60W 10/10 |
| 2019/0344783 | A1* | 11/2019 | Bertollini | B60W 60/0013 |
| 2019/0346845 | A1* | 11/2019 | Rottkamp | B60W 30/0956 |

(Continued)

OTHER PUBLICATIONS

PCT International Search Report and Written Opinion issued in corresponding application No. PCT/US2022/043250, dated Dec. 1, 2022.

*Primary Examiner* — Matthew J. Reda
(74) *Attorney, Agent, or Firm* — Maschoff Brennan

(57) ABSTRACT

A method may include obtaining localization information and control signal information relating to an autonomous vehicle (AV). The method may include computing first kinematic characteristics of the AV based on the localization information and the control signal information and generating a first vehicle model based on the first kinematic characteristics. The method may include determining one or more first control commands that provide instructions for actuating a driving operation of the AV. The first control commands may be determined based on the first vehicle model. The method may include simulating first movement of the AV according to the first control commands and the first vehicle model.

18 Claims, 8 Drawing Sheets

(56) References Cited

U.S. PATENT DOCUMENTS

| | | | |
|---|---|---|---|
| 2020/0051327 A1* | 2/2020 | Dolan | G06T 15/04 |
| 2020/0103912 A1* | 4/2020 | Zhu | G05D 1/0088 |
| 2020/0142405 A1* | 5/2020 | Havens | G05D 1/0088 |
| 2020/0377085 A1* | 12/2020 | Floyd-Jones | B60W 30/09 |
| 2020/0409368 A1* | 12/2020 | Caldwell | G05D 1/0038 |
| 2021/0046923 A1* | 2/2021 | Olson | B60W 60/0015 |
| 2021/0048818 A1* | 2/2021 | Funke | B60W 30/09 |
| 2021/0139038 A1* | 5/2021 | Wang | G05D 1/0088 |
| 2021/0166474 A1* | 6/2021 | Behar | G06V 20/56 |
| 2021/0197852 A1* | 7/2021 | Fairfield | B60W 60/001 |
| 2021/0264794 A1* | 8/2021 | Merwaday | H04W 4/46 |
| 2022/0250644 A1* | 8/2022 | Larsson | B60W 60/0015 |

\* cited by examiner

SYSTEM AND METHOD OF ADAPTIVE, REAL-TIME VEHICLE SYSTEM IDENTIFICATION FOR AUTONOMOUS DRIVING

CROSS-REFERENCE TO RELATED APPLICATIONS

This application claims the benefit of U.S. Patent Application Ser. No. 63/243,009, filed on Sep. 10, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of adaptive, real-time vehicle system identification for autonomous driving.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining localization information and control signal information relating to an autonomous vehicle (AV). The method may include computing first kinematic characteristics of the AV based on the localization information and the control signal information and generating a first vehicle model based on the first kinematic characteristics. The method may include determining one or more first control commands that provide instructions for actuating a driving operation of the AV. The first control commands may be determined based on the first vehicle model. The method may include simulating first movement of the AV according to the first control commands and the first vehicle model.

In some embodiments, the method may further comprise obtaining the first control signals and updated localization information resulting from actuated movement of the AV according to the simulated first movement of the AV. The method may further comprise computing second kinematic characteristics of the AV based on the first control signals and the updated localization information and generating a second vehicle model based on the second kinematic characteristics. The method may further comprise determining one or more second control commands based on the second vehicle model and simulating second movement of the AV according to the second control commands and the second vehicle model.

In some embodiments, the method may further comprise performing a validation check of the first control commands before simulating the first movement of the AV in which performing the validation check includes comparing the first vehicle model to the obtained localization information and the obtained control signal information, identifying an erroneous model parameter associated with the first vehicle model based on the comparison between the first vehicle model and the obtained localization information and the obtained control signal information, and determining the first control commands. The first control commands may be adjusted according to the erroneous model parameter.

In some embodiments, obtaining the localization information and the control signal information relating to the AV may include aligning the obtained localization information and the obtained control signal information with respect to time of data capture or spatial positioning of data and filtering one or more data points associated with the obtained localization information and the obtained control signal information. The one or more data points may include sensor noise or inconsistent data points.

In some embodiments, computing the first kinematic characteristics of the AV may include identifying a vehicle type corresponding to the AV. The vehicle type corresponding to the AV may include at least one of: a sedan, a sports utility vehicle, a hatchback, a convertible, a coupe, a pickup truck, an eighteen-wheeler truck, a motorcycle, a van, an emergency services vehicle, a forklift, a crane, a train, a stock chaser, an airplane, an unmanned aerial vehicle, a drone, and a robotic vacuum cleaner.

In some embodiments, the first kinematic characteristics and the second kinematic characteristics may include at least one of: a length of the AV, a height of the AV, a center of gravity of the AV, a passenger position within the AV, a wheel diameter of a wheel included with the AV, a tire tread depth of the wheel, a tire thickness of the wheel, a turning radius of the AV, a turning axis of the AV, a velocity of the AV, an acceleration of the AV, and a jerk of the AV.

In some embodiments, the method may further comprise receiving a vehicle-agnostic command relative to a desired trajectory of the AV. The first control commands may be customized to the AV based on the first kinematic characteristics such that the AV travels along the desired trajectory.

One or more embodiments of the present disclosure may include one or more non-transitory computer-readable storage media configured to store instructions that, in response to being executed, cause a system to perform operations. The operations may include obtaining localization information and control signal information relating to an autonomous vehicle (AV). The operations may include computing first kinematic characteristics of the AV based on the localization information and the control signal information and generating a first vehicle model based on the first kinematic characteristics. The operations may include determining one or more first control commands that provide instructions for actuating a driving operation of the AV. The first control commands may be determined based on the first vehicle model. The operations may include simulating first movement of the AV according to the first control commands and the first vehicle model.

In some embodiments, the operations may further comprise obtaining the first control signals and updated localization information resulting from actuated movement of the AV according to the simulated first movement of the AV. The operations may further comprise computing second kinematic characteristics of the AV based on the first control signals and the updated localization information and generating a second vehicle model based on the second kinematic characteristics. The operations may further comprise determining one or more second control commands based on the second vehicle model and simulating second movement of the AV according to the second control commands and the second vehicle model.

In some embodiments, the operations may further comprise performing a validation check of the first control commands before simulating the first movement of the AV in which performing the validation check includes comparing the first vehicle model to the obtained localization information and the obtained control signal information, identifying an erroneous model parameter associated with the first vehicle model based on the comparison between the first vehicle model and the obtained localization information and the obtained control signal information, and determining the first control commands. The first control commands may be adjusted according to the erroneous model parameter.

In some embodiments, obtaining the localization information and the control signal information relating to the AV may include aligning the obtained localization information and the obtained control signal information with respect to time of data capture or spatial positioning of data and filtering one or more data points associated with the obtained localization information and the obtained control signal information. The one or more data points may include sensor noise or inconsistent data points.

In some embodiments, computing the first kinematic characteristics of the AV may include identifying a vehicle type corresponding to the AV. The vehicle type corresponding to the AV may include at least one of: a sedan, a sports utility vehicle, a hatchback, a convertible, a coupe, a pickup truck, an eighteen-wheeler truck, a motorcycle, a van, an emergency services vehicle, a forklift, a crane, a train, a stock chaser, an airplane, an unmanned aerial vehicle, a drone, and a robotic vacuum cleaner.

In some embodiments, the operations may further comprise receiving a vehicle-agnostic command relative to a desired trajectory of the AV. The first control commands may be customized to the AV based on the first kinematic characteristics such that the AV travels along the desired trajectory.

One or more embodiments of the present disclosure may include a system that includes one or more processors. The system may include one or more non-transitory computer-readable storage media configured to store instructions that, in response to being executed, cause the system to perform operations. The operations may include obtaining localization information and control signal information relating to an autonomous vehicle (AV). The operations may include computing first kinematic characteristics of the AV based on the localization information and the control signal information and generating a first vehicle model based on the first kinematic characteristics. The operations may include determining one or more first control commands that provide instructions for actuating a driving operation of the AV. The first control commands may be determined based on the first vehicle model. The operations may include simulating first movement of the AV according to the first control commands and the first vehicle model.

In some embodiments, the operations may further comprise obtaining the first control signals and updated localization information resulting from actuated movement of the AV according to the simulated first movement of the AV. The operations may further comprise computing second kinematic characteristics of the AV based on the first control signals and the updated localization information and generating a second vehicle model based on the second kinematic characteristics. The operations may further comprise determining one or more second control commands based on the second vehicle model and simulating second movement of the AV according to the second control commands and the second vehicle model.

In some embodiments, the operations may further comprise performing a validation check of the first control commands before simulating the first movement of the AV in which performing the validation check includes comparing the first vehicle model to the obtained localization information and the obtained control signal information, identifying an erroneous model parameter associated with the first vehicle model based on the comparison between the first vehicle model and the obtained localization information and the obtained control signal information, and determining the first control commands. The first control commands may be adjusted according to the erroneous model parameter.

In some embodiments, obtaining the localization information and the control signal information relating to the AV may include aligning the obtained localization information and the obtained control signal information with respect to time of data capture or spatial positioning of data and filtering one or more data points associated with the obtained localization information and the obtained control signal information. The one or more data points may include sensor noise or inconsistent data points.

In some embodiments, computing the first kinematic characteristics of the AV may include identifying a vehicle type corresponding to the AV. The vehicle type corresponding to the AV may include at least one of: a sedan, a sports utility vehicle, a hatchback, a convertible, a coupe, a pickup truck, an eighteen-wheeler truck, a motorcycle, a van, an emergency services vehicle, a forklift, a crane, a train, a stock chaser, an airplane, an unmanned aerial vehicle, a drone, and a robotic vacuum cleaner.

In some embodiments, the operations may further comprise receiving a vehicle-agnostic command relative to a desired trajectory of the AV. The first control commands may be customized to the AV based on the first kinematic characteristics such that the AV travels along the desired trajectory.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
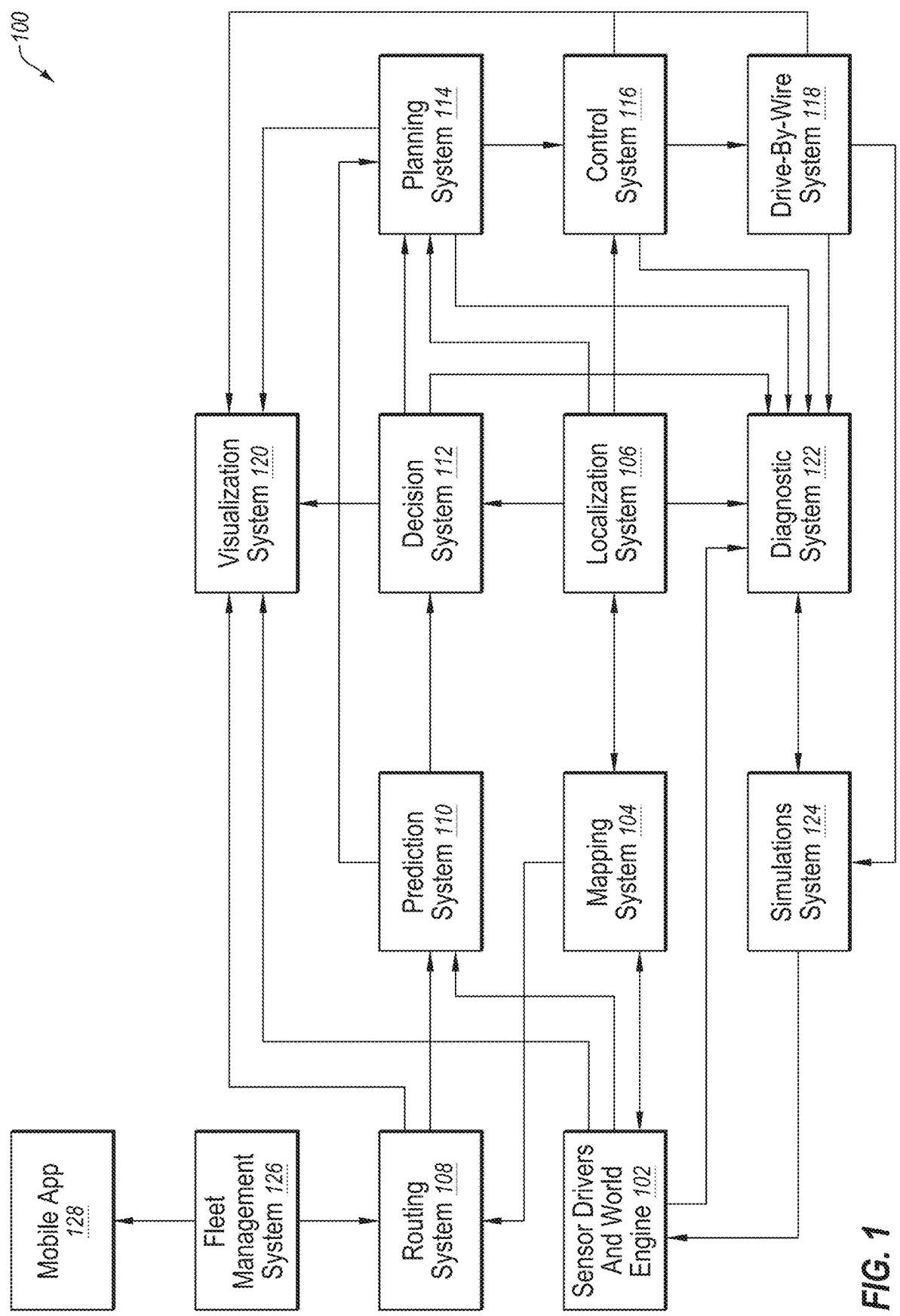
FIG. 1 illustrates an example embodiment of an autonomous driving system according to at least one embodiment of the present disclosure.

An autonomous driving system may be implemented on a wide variety of vehicles with each vehicle that the autonomous driving system is implemented on having one or more differences in the vehicles' kinematic characteristics. For example, vehicles may include different centers of mass, bumper sizes, seating arrangements, heights, widths, lengths, steering wheel positions, turning radii, weights, and/or any other kinematic characteristics relative to other vehicles on which the autonomous driving system has been implemented. As such, the autonomous driving system may account for different kinematic characteristics and differences of a given vehicle relative to other vehicles when the autonomous driving system is being implemented on the given vehicle.

Additionally or alternatively, the kinematic characteristics of the given vehicle at a first point in time may be different from the kinematic characteristics of the same given vehicle at a second point in time. For example, components of the given vehicle, such as tire treads, brake pads, radiators, and/or shock absorbers, may degrade over time. As an additional or alternative example, the weight associated with the given vehicle may decrease over time as fuel is burned during operation of the given vehicle, as portions of a load are periodically delivered off of a truck, or other changes in amount or distribution of weight.

Existing autonomous driving systems and/or existing manually driven vehicle systems in general may or may not track one or more vehicle kinematic characteristics that may have an influence on the driving of the vehicle. A given vehicle operating in correspondence with the existing autonomous driving systems and/or users of the existing manually driven vehicle systems may be prone to making errors in vehicle operation because the existing autonomous driving systems and/or existing manually driven vehicle systems may not track and/or may track vehicle kinematic characteristics with insufficient granularity, and the actual kinematic characteristics of the given vehicle are not properly represented by the existing autonomous driving systems and/or the existing manually driven vehicle systems. However, even minor errors regarding the given vehicle's kinematic characteristics may cause significant deviations in the operations of the given vehicle. For example, a given vehicle moving at a high speed traveling according to a first bearing may travel to a significantly different end point than the same given vehicle moving at the same high speed according to a second bearing that differs from the first bearing by a small angular adjustment (e.g., one degree, two degrees, etc.).

Additionally or alternatively, the existing autonomous driving systems and/or the existing manually driven vehicle systems may not be exchangeable between two or more vehicles because application of a given force and/or a given control command to two different vehicles may result in different operations being performed by each of the two different vehicles. As the two vehicles become increasingly distinct from one another, the existing autonomous driving systems and/or the existing manually driven vehicle systems may become less and less transferable. In some situations, application of the same given force and/or the same given control command to a single given vehicle at different times may result in different operations being performed because the given vehicle may experience a change in one or more of its kinematic characteristics, such as a change in the number of passengers on board the given vehicle, addition of cargo to the given vehicle, damage to one or more aspects of the given vehicle, some combination thereof, or any other changes to the given vehicle that may affect the kinematic behavior of the given vehicle.

The present disclosure may relate to, among other things, a method and/or a system of determining vehicle kinematic characteristics of a given vehicle adaptively and in real time for an autonomous driving system implemented in relation to the given vehicle. A system-identification characterization system according to at least one embodiment of the present disclosure may be configured to generate a vehicle model of a given control target (e.g., a sedan, a bus, a drone, etc.) that facilitates control of the given control target by an autonomous driving system associated with the system-identification characterization system. The vehicle model may describe one or more of the unique kinematic characteristics of the given control target such that control of the given control target may be tailored according to the unique kinematic characteristics of the given control target.

Vehicle model generation according to the present disclosure may improve autonomous driving systems by more efficiently and/or accurately modeling and/or simulating specific vehicles on which the autonomous driving systems are implemented. As such, the system-identification characterization system may make autonomous driving systems more reliable and/or safer. Additionally or alternatively, the system-identification characterization system may improve scalability of autonomous driving systems by facilitating implementation of a particular autonomous driving system on various unique vehicles. As such, the system-identification characterization system may make fleet-level management of autonomous driving systems more effective. Additionally or alternatively, the system-identification characterization system may improve detection of hardware changes and/or performance degradation corresponding to a given vehicle on which the system-identification characterization system is implemented.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control commands that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control commands implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2:
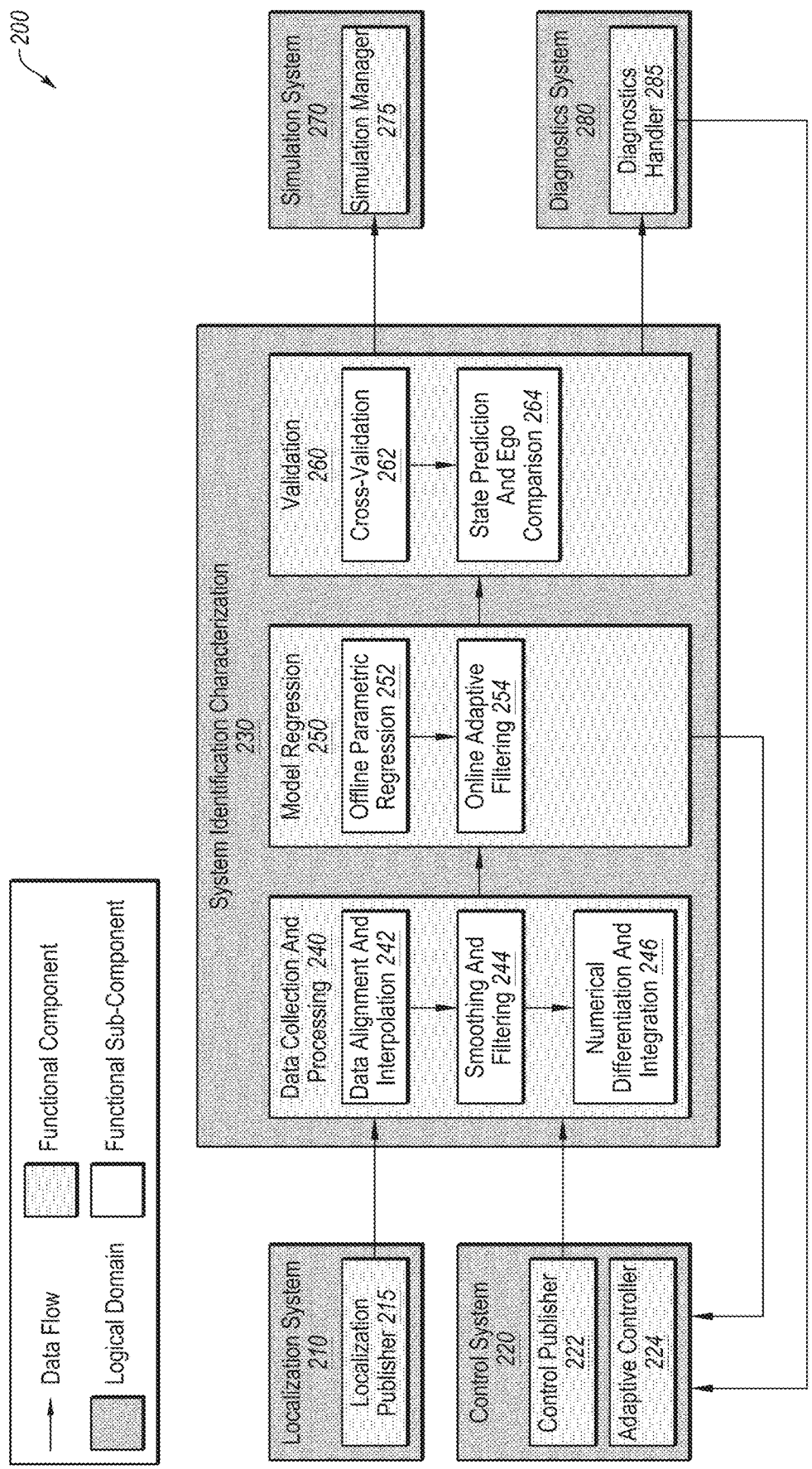
FIG. 2 illustrates an example architecture for a system-identification characterization system according to at least one embodiment of the present disclosure.

FIG. 2 illustrates an example architecture for a system-identification characterization system 200 according to the present disclosure. In some embodiments, the system-identification characterization system 200 may include a localization system 210, a control system 220, a system identification characterization 230, a simulation system 270, and/or a diagnostics system 280. In these and other embodiments, the system-identification characterization system 200 may be configured to obtain information from the localization system 210 and/or the control system 220, generate a vehicle model based on the obtained information, and output the vehicle model to the simulation system 270 and/or the diagnostics system 280.

The computing systems and/or computing subsystems of the system-identification characterization system 200 may include code and routines configured to enable a computing system to perform one or more operations. Additionally or alternatively, the computing systems and/or the computing subsystems may be implemented using hardware including a processor, a microprocessor (e.g., to perform or control performance of one or more operations), a field-programmable gate array (FPGA), or an application-specific integrated circuit (ASIC). In some other instances, the computing systems and/or the computing subsystems may be implemented using a combination of hardware and software. In the present disclosure, operations described as being performed by the computing systems and/or the computing subsystems may include operations that the computing systems and/or the computing subsystems may direct a corresponding system to perform. The computing systems and/or the computing subsystems may be configured to perform a series of operations with respect to the information obtained from the localization system 210 and/or the control system 220.

The localization system 210 may include a localization publisher 215 that formats localization information about a given autonomous vehicle (AV) as computed by localization system 210 so that the system identification characterization 230 may obtain the localization information. In some embodiments, the localization system 210 may determine a location and/or orientation of the given AV with respect to an environment in which the given AV operates based on obtained and processed sensor information. The localization system 210 may determine the location and/or the orientation of the given AV over time such that changes in the location and/or the orientation of the given AV may be tracked at multiple points in time. The location, the orientation, changes in the location over time, changes in the orientation over time, or some combination thereof may provide insight on kinematic characteristics of the given AV, such as the given AV's velocity, acceleration, physical dimensions, engine power, some combination thereof, or any other kinematic characteristics of the given AV.

The control system 220 may include a control publisher 222 that formats control signal information about the given AV so that the system identification characterization 230 may obtain the control signal information. Control signals may be provided to the given AV and describe one or more driving operations that the given AV may be directed to perform. In some embodiments, the control signals may include instructions directed to an actuation component of the given AV. The system identification characterization 230 may be configured to determine one or more of the given AV's kinematic characteristics based on how the control signals direct control of the actuation component. For example, control signals relating to braking may provide information regarding the size, the engine power, tire properties, braking system properties, or any other kinematic characteristics relating to the given AV. As an additional or alternative example, control signals relating to steering the given AV may facilitate identifying what type of vehicle the given AV is, such as a sedan, an eighteen-wheeler truck, a forklift, an aircraft, or any other vehicle.

In some embodiments, the control system 220 may be configured to obtain control signals that include information relating to how upstream computing systems associated with the given AV have determined a driving operation actuation system (e.g., a drive-by-wire system) of the given AV should be instructed to perform one or more driving operations. Additionally or alternatively, the control system 220 may be configured to obtain control signals that include vehicle-agnostic instructions regarding the desired motion of the given AV. For example, the control signals may include a desired trajectory with a set number of points and times at which the given AV is expected to be at those points. In these and other embodiments, the control system 220 may be configured to output control commands to actually implement the driving operations (e.g., commands to the drive-by-wire system) such that the given AV traverses along the desired trajectory. In these and other embodiments, the control system 220 may generate, output, modify, customize, or otherwise produce the control commands based on the kinematic characteristics. For example, a certain amount of torque for a target acceleration may be higher when a fuel tank is full and lower when the fuel tank is almost empty. Continuing the example, the control system 220 may customize the drive-by-wire torque commands based on the most current kinematic characteristics of the given AV.

In some embodiments, a given control command outputted by the control system 220 may be obtained by a simulations system, such as the simulations system 270, and/or a diagnostics system, such as the diagnostics system 280, so that the given control command may be reviewed before being implemented by the driving operation actuation system.

In some embodiments, the control commands outputted by the control system 220 may be iteratively obtained by the system identification characterization 230 as updated control signal information such that updated control commands that more accurately and/or more safely guide driving operations of the given AV may be determined.

In some embodiments, the control system 220 may include an adaptive controller 224 that is configured to obtain information from the system identification characterization 230 and/or the diagnostics system 280 so that control commands being implemented by the given AV and/or obtained by the system identification characterization 230 may be updated as the kinematic characteristics of the given AV are determined by the system identification characterization 230. In these and other embodiments, determining the kinematic characteristics of the given AV may be an iterative process in which the system identification characterization 230 determines initial kinematic characteristics based on initial input from the localization system 210 and/or the control system 220. The control system 220 may obtain the initial kinematic characteristics from the system identification characterization 230 and update the control signal information being sent to the system identification characterization 230 such that future kinematic characteristics determined by the system identification characterization 230 may become more accurate and/or detailed.

In some embodiments, the system identification characterization 230 may include one or more computing modules, such as a data-collection and processing subsystem 240, a model regression subsystem 250, and/or a validation subsystem 260. The data-collection and processing subsystem 240 may be configured to obtain incoming information (e.g., localization information describing a position, velocity, and/or acceleration of the vehicle and/or one or more control commands) to the system identification characterization 230 and process the data for analysis by the model regression subsystem 250. In some embodiments, the data-collection and processing subsystem 240 may include a data alignment and interpolation subsystem 242 that is configured to align the incoming information according to data formatting, time of data capture, reference frame of localization, and/or any other parameters that may differ between data points included in the incoming information. Additionally or alternatively, the data alignment and interpolation subsystem 242 of the data-collection and processing subsystem 240 may be configured to interpolate one or more additional data points based on the incoming information to facilitate the generation of more accurate and/or reliable vehicle models.

Additionally or alternatively, the data-collection and processing subsystem 240 may include a smoothing and filtering subsystem 244 that is configured to remove noisy data and/or inconsistent data points such that the model regression subsystem 250 may be provided with a lower volume of input information that is more representative of the AV than unfiltered input information for generating the vehicle model.

In some embodiments, the data-collection and processing subsystem 240 may include a numerical differentiation and integration subsystem 246 that may be configured to perform one or more mathematical operations on the incoming information to determine one or more parameters that may be useful for generating the vehicle model. The data-collection and processing subsystem 240 may perform numerical differentiation and/or integration on one or more data points included in the incoming information to calculate one or more new parameters based on the existing data points that may be transmitted with the incoming information to the model regression subsystem 250. Numerical differentiation and/or integration may be applied to the incoming localization information and/or control information to compute parameters associated with the AV that may or may not be captured by information-collection processes of the AV. For example, a given AV may collect information regarding the location of the given AV at different times, but the given AV may or may not collect information regarding the given AV's velocity. The numerical differentiation and integration subsystem 246 may compute the velocity of the given AV based on changes in the location of the given AV over time based on the collected information. Additionally or alternatively, the numerical differentiation and integration subsystem 246 may compute the acceleration of the given AV based on changes in the computed velocity of the given AV over time. Additionally or alternatively, numerical differentiation and integration subsystem 246 may compute a jerk of the given AV based on changes in the computed acceleration of the given AV over time.

Determining information about the kinematic characteristics of the given AV at two or more layers of differentiation and/or integration may provide important context for guiding autonomous driving of the given AV. For a manually operated vehicle, the human driver may have an innate feel for the velocity, the acceleration, the angular acceleration, and/or any other kinematic characteristics of the manually operated vehicle. For a given AV, however, acceleration, steering, and/or any other driving operations of the given AV may be determined with or without input from a human user who may or may not be riding the given AV. Thus, computing derivative and/or integrated values corresponding to the given AV's kinematic characteristics may facilitate safer and/or more accurate driving operations because the kinematic characteristics, and consequently kinematic behavior, of the given AV may be better modeled by an autonomous driving system that implements the system-identification characterization system 200.

Additionally or alternatively, the numerical differentiation and integration subsystem 246 computing derivative and/or integrated values based on the kinematic characteristics may facilitate distinguishing between extrinsic and intrinsic factors that affect driving of the given AV. Extrinsic factors may involve features included in the environment of the given AV that affect the driving of the given AV. For example, the extrinsic factors may include changing directions of a road on which the given AV is driving, elevation changes in the road, changing friction conditions of the road (e.g., asphalt-to-cement transitions, wet spots on the road, etc.), wind speeds, wind directions, some combination thereof, or any other environmental features. Intrinsic factors may involve features that are directly related to the given AV. For example, the intrinsic factors may include tire tread depth, tire thickness, tire pressure, gear shift, driving mode, or any other aspects that may be related to the vehicle itself.

Computing derivative and/or integrated values of the kinematic characteristics may facilitate detecting a change in driving conditions of the given AV and determining whether the change in the driving conditions corresponds to a change in the extrinsic factors and/or a change in the intrinsic factors of the given AV. Based on whether the change in the driving conditions corresponds to a change in the extrinsic factors and/or the intrinsic factors may inform how the given AV should modify the control commands that instruct driving of the given AV to respond to the changed driving conditions. For example, a given change in driving conditions may include the given AV moving from a dry road surface to a wet road surface resulting in a reduced friction coefficient of the road surface, which may be detected by the given AV when the given AV attempts to accelerate and/or brake. The given AV may determine that the given change in driving conditions is an extrinsic factor because a change in the velocity of the given AV has decreased after transitioning to the wet road surface relative to when the given AV was driving on the dry road surface despite applying the same or a similar force for accelerating and/or braking.

The model regression subsystem 250 may obtain the pre-processed information analyzed by the data-collection and processing subsystem 240, and an offline parametric regression subsystem 252 may be configured to perform a parametric regression analysis of the obtained information to generate the vehicle model. In some embodiments, the vehicle model may include a mathematical representation of the vehicle that may be sent to the simulation system 270 for further analysis. In these and other embodiments, the vehicle model may include one or more model parameters that relate to a longitudinal component that represents motion and speed of the modeled vehicle and/or a lateral component that represents steering and orientation of the modeled vehicle. The longitudinal component and/or the lateral component of the vehicle model may be characterized based on one or more parameters included in the incoming information and/or determined during pre-processing of the incoming information. For example, the longitudinal component may be parameterized based on a drag coefficient (e.g., a numerical value indicative of the effect of wind drag on the modeled AV), a rolling resistance factor (e.g., a numerical value indicative of the effect of tire friction on movement of the modeled AV), a throttle/braking scaling factor, a throttle deadband coefficient (e.g., a numerical value indicative of the effect of vehicular controls on the movement of the modeled AV), and/or a speed-feedback delay of the vehicle in which these and other parameters may be obtained and/or calculated based on incoming localization information and/or vehicle information. As another example, the lateral component may be parameterized based on a steering scaling factor, a static steering offset (e.g., a numerical value representative of the difference between an input control command and an output behavior of steering controls of the modeled AV), and/or a yaw-feedback delay (e.g., a numerical value indicative of the responsiveness of the steering controls of the modeled AV).

Additionally or alternatively, the vehicle model may include one or more model parameters that relate to vehicle piloting settings. For example, the vehicle model may account for the gear in which the AV is shifted and/or a driving mode of the AV (e.g., comfort mode, sports mode, etc.). Additionally or alternatively, the vehicle model may include one or more model parameters that account for intrinsic properties of the AV, such as the AV being a sedan, an eighteen-wheeler, a forklift, a cleaning robot, etc. In some embodiments, a separate vehicle model may be generated and/or used for each of the different gears the AV may be shifted into and/or the different driving modes.

The offline parametric regression subsystem 252 of the model regression subsystem 250 may be configured to determine the model parameters of the vehicle model by solving for mathematical relationships between the input information from the localization system 210 and/or the control system 220 and the model parameters corresponding to the longitudinal and/or lateral components of the vehicle model. In some embodiments, solving for the mathematical relationships between one or more of a given piece of input information and a given model parameter may include determining one or more mathematical coefficients that relate the values of the given input information to the value of the given model parameter.

An online adaptive filtering subsystem 254 of the model regression subsystem 250 may perform adaptive filtering of the generated vehicle model to identify one or more model parameters that may be sent to an adaptive controller of the control computing subsystem to assist with determining one or more control commands. In some embodiments, the online adaptive filtering subsystem 254 may be configured to obtain the pre-processed information analyzed by the data-collection and processing subsystem 240 and/or the model parameters of the vehicle model as determined by the offline parametric regression subsystem 252 as input data. The online adaptive filtering subsystem 254 may make some determination and/or process a transformation based on the input data to generate one or more model parameter outputs. In these and other embodiments, the online adaptive filtering subsystem 254 may include, for example, a Kalman filter, an extended Kalman filter, a stabilization filter, some combination thereof, or any other filters in the mathematics and/or physics domain.

In some embodiments, the online adaptive filtering subsystem 254 may be configured to communicate with an off-board computer system to facilitate performance of decision-making, input transformations, and/or any other computations related to operations of the online adaptive filtering subsystem 254. By offloading some of the computations associated with the online adaptive filtering subsystem 254 to the off-board computer system, more resources may be available for computing one or more of the output model parameters. In these and other embodiments, the offline parametric regression subsystem 252 may be configured to perform computations with lower latency and/or more quickly than the online adaptive filtering subsystem 254 because the computations corresponding to the offline parametric regression subsystem 252 may be performed locally on-board the AV associated with the offline parametric regression subsystem 252.

In some situations, model parameter computations may be allocated between the offline parametric regression subsystem 252 and the online adaptive filtering subsystem 254 such that the offline parametric regression subsystem 252 is configured to perform most of the model parameter computations, while the online adaptive filtering subsystem 254 is configured to perform any remaining computations not allocated to the offline parametric regression subsystem 252. Additionally or alternatively, the online adaptive filtering subsystem 254 may be configured to perform most of the model parameter computations, while the offline parametric regression subsystem 252 is configured to perform remaining computations not allocated to the online adaptive filtering subsystem 254. Additionally or alternatively, particular model parameter computations may be allocated to the offline parametric regression subsystem 252 and/or the online adaptive filtering subsystem 254. Additionally or alternatively, the offline parametric regression subsystem 252 and the online adaptive filtering subsystem 254 may each perform the model parameter computations such that the results of the model parameter computations as determined by the offline parametric regression subsystem 252 and the online adaptive filtering subsystem 254 may be compared against each other and/or used to supplement one another.

In some embodiments, the offline parametric regression subsystem 252 is configured to perform operations involving values or parameters that are less frequently utilized and/or may not be time-sensitive in operation of the AV. For example, the offline parametric regression subsystem 252 may perform operations for values utilized once per second, or once every five seconds. Additionally or alternatively, the online adaptive filtering subsystem 254 may be configured to perform operations involving values or parameters that are more frequently utilized and/or are time-sensitive in operation of the AV. For example, the online adaptive filtering subsystem 254 may perform operations for values utilized once per second, five times per second, ten times per second, etc.

The control system 220 may be configured to obtain the model parameters identified by the model regression subsystem 250 and generate one or more control commands that provide instructions for maneuvering the vehicle model based on the obtained model parameters. For example, the control system 220 may obtain model parameters relating to the length and/or width of a given vehicle model and generate a control command instructing the vehicle model to drive forward in a straight line for a given period of time in an environment with one or more boundaries to evaluate the accuracy of the obtained model parameters. Additionally or alternatively, the control commands of the control system 220 may be generated based on a validation status determined by the diagnostics system 280 as described in further detail below.

Additionally or alternatively, the control system 220 may obtain a vehicle-agnostic control commands that describe a desired trajectory of the AV. For example, a given vehicle-agnostic control command may describe moving the AV to a first point at a first time, a second point at a second time, and a third point at a third time. The control system 220 may be configured to affect movement of the AV according to the vehicle-agnostic control commands. In some embodiments, the control system 220 may be configured to customize control signals provided to the AV based on the kinematic characteristics and/or the model parameters identified by the model regression subsystem 250 such that the AV travels along the desired trajectory specified by the vehicle-agnostic control commands. In these and other embodiments, a given vehicle-agnostic control command may be sent to one or more AVs, and each of the AVs that receives the given vehicle-agnostic control command may determine control signals tailored to the kinematic characteristics of each of the AVs so that the one or more AVs may perform the given vehicle-agnostic control command despite having different kinematic characteristics, being located at different locations, or some combination thereof.

In these and other embodiments, operations of the system identification characterization 230, the control system 220, the diagnostics system 280, and/or the simulation system 270 may be iterative. For example, the system identification characterization 230 may iteratively generate vehicle models based on obtained localization information and/or control commands from the control system 220, and the diagnostics system 280 may iteratively evaluate the generated vehicle model. As further examples, the control system 220 may iteratively generate control commands that facilitate further analysis of the vehicle models, and the simulation system 270 may iteratively simulate the generated vehicle models. As such, operation the system-identification characterization system 200 in an iterative loop may allow the system-identification characterization system 200 to constantly and/or repeatedly improve the generated vehicle models to better represent the vehicle on which the vehicle models are based.

The system identification characterization 230 may include a validation subsystem 260, which may be configured to check the accuracy of the generated vehicle model against one or more known metrics. For example, a cross-validation subsystem 262 and/or a state-prediction-and-ego-comparison subsystem 264 of the validation subsystem 260 may be configured to compare the vehicle model with one or more metrics included in the information obtained from the localization system 210 and/or the control system 220, such as state-prediction and/or vehicle-position information obtained from the localization system 210.

In some embodiments, validation of the vehicle model by the cross-validation subsystem 262 may involve applying input information collected and processed by the data-collection and processing subsystem 240 to the model parameters computed by the model regression subsystem 250 and determining whether the computed output based on the input information and the model parameters appears to accurately represent the AV within a given threshold. For example, a given model regression subsystem 250 may compute one or more given model parameters that represent a given AV. Input information obtained by the given AV may be applied to the given model parameters computed by the given model regression subsystem 250 to output a vehicle model represented as a mathematical representation of the given AV.

In some embodiments, validation of the vehicle model by the state-prediction-and-ego-comparison subsystem 264 may involve comparing parameters of the vehicle model to one or more known parameters of the AV. Known parameters associated with the AV may be determined based on information about the AV during a previous computational iteration of the system-identification characterization system 200. For example, a given AV may be traveling in a straight line, and a first given computational iteration may involve computing a first vehicle model corresponding to the given AV over a first time period (e.g., over 5 ms, over 10 ms, over 20 ms, over 50 ms, over 100 ms, over 0.5 seconds, over 1 second, or any other time period). During a second given computational iteration immediately following the first given computational iteration, a second vehicle model corresponding to the given AV may be computed such that the second vehicle model represents the given AV along its straight-line path after the first time period has elapsed. One or more model parameters associated with the second vehicle model may be validated by the state-prediction-and-ego-comparison subsystem 264 by using the known information about the given AV from the first computational iteration as inputs to the second vehicle model.

In a first scenario, for example, the validation subsystem 260 may determine that the vehicle model is a good representation of the AV because the parameters of the vehicle model are similar to the known parameters of the AV. In these and other situations, the validation subsystem 260 may take no actions regarding revising the vehicle model.

In a second scenario, for example, the validation subsystem 260 may determine that the vehicle model does not accurately represent the AV because the parameters of the vehicle model are dissimilar to the known parameters of the AV. In these and other situations, the validation subsystem 260 may signal the model regression subsystem 250 to recalculate the mathematical coefficients relating the input information obtained by the model regression subsystem 250 and the output model parameters of the vehicle model. Additionally or alternatively, the validation subsystem 260 may signal the model regression subsystem 250 to obtain more information to recalculate the mathematical coefficients of the vehicle model with a larger pool of input information.

In a third scenario, for example, the validation subsystem 260 may determine that the vehicle model differs significantly from the AV. Additionally or alternatively, the validation subsystem 260 may determine that the vehicle model includes one or more systemic errors that cause the vehicle model to differ from the AV. In these and other situations, the validation subsystem 260 may introduce one or more new parameters to the mathematical relationships between the inputs and the output model parameters and/or remove one or more parameters previously included in the mathematical relationships. For example, the validation subsystem 260 may determine that the error between the vehicle model and the AV is significant during a particular time window and conclude that a given delay factor, such as a speed-feedback delay and/or a yaw-feedback delay, should be adjusted. As another example, the validation subsystem 260 may determine that the error between the vehicle model and the AV is significant within a particular region of control and conclude that a given deadband coefficient should be adjusted. In these and other embodiments, determining what types of errors exist between the vehicle model and the AV and how to correct for different types of errors may be facilitated by a machine-learning approach. Additionally or alternatively, determining and correcting errors may be facilitated by a human user monitoring the system identification characterization 230, in which decisions made by the human user may be used in training the machine-learning approach.

In some embodiments, the system-identification characterization system 200 may determine and/or compute the kinematic characteristics of the AV at a set refresh rate, such as at a rate of 1 Hertz (Hz), 2 Hz, 5 Hz, 10 Hz, 20 Hz, or at any other refresh rate. Additionally or alternatively, the rate at which the system-identification characterization system 200 assess the kinematic characteristics of the AV may be adaptive based on a degree of busyness experienced by the AV during a given time period, which may be based on a number of changes in the kinematic characteristics, a number of objects in the vicinity of the AV, a speed of the AV, or any other criteria for determining whether the AV is busy. In situations in which the AV may be determined to be busy, the refresh rate of determining the kinematic characteristics of the AV may increase, while the refresh rate may decrease in situations in which the AV is determined to not be busy. Additionally or alternatively, different kinematic characteristics may be reviewed and/or computed at different refresh rates. For example, kinematic characteristics related to physical dimensions of the AV may be reviewed at a first refresh rate, while kinematic characteristics related to movement of the AV may be reviewed at a second refresh rate that is faster than the first refresh rate.

In some embodiments, the validation status indicating whether the vehicle model is verified by the validation subsystem 260 may be sent to the diagnostics system 280, which may review and transmit the validation status to the adaptive controller 224 of the control system 220. The control system 220 may update the outputted control commands in response to receiving a validation status indicating that the vehicle model has failed the validation check during a given iteration. Additionally or alternatively, the control system 220 may or may not make adjustments to the outgoing control commands in response to receiving a validation status indicating that the vehicle model has passed the validation check during a given iteration.

In some embodiments, a diagnostic handler 285 of the diagnostics system 280 and/or the diagnostics system 280 may determine one or more faults with the vehicle model in response to receiving the validation status indicating the vehicle model has failed the validation check. In these and other embodiments, the diagnostics system 280 may determine one or more aspects, regions, and/or components of the vehicle model that caused the vehicle model to fail the validation check based on which parameter of the vehicle model failed to match with and/or otherwise correspond to the known value of the parameter. For example, the diagnostics system 280 may determine that a given vehicle model includes an erroneous turning radius based on a known turning radius value for a vehicle corresponding to the given vehicle model. Continuing the example, the diagnostics system 280 may alert the control system 220 of the erroneous turning radius, and in response, the control system 220 may generate a control command instructing a vehicle model updated based on the erroneous turning radius to make one or more turns to test one or more model parameters associated with the updated vehicle model.

In some embodiments, the simulation system 270 and/or a simulation manager 275 associated with the simulation system 270 may obtain the vehicle model and simulate application of the vehicle model to a given vehicle maneuver as described by one or more of the control commands. Responsive to the simulation system 270 determining that the vehicle model may successfully perform the given vehicle maneuver, the vehicle model may be sent to and used by a downstream controller for the corresponding autonomous vehicle to control real-world operation of the corresponding autonomous vehicle. In some embodiments, the simulation system 270 of the system-identification characterization system 200 may be configured to autonomously and/or dynamically perform simulation operations. Because the simulation system 270 may be configured to take the vehicle model generated by the model regression subsystem 250 and validated by the validation subsystem 260 as input, the simulation system 270 may receive dynamically updated information that represents a most recent state of a given AV, which may facilitate operation simulation of the given AV using up-to-date information about the given AV.

Modifications, additions, or omissions may be made to the system-identification characterization system 200 without departing from the scope of the present disclosure. For example, the designations of different elements in the manner described is meant to help explain concepts described herein and is not limiting. For instance, the localization system 210, the control system 220, the system identification characterization 230, the simulation system 270, and/or the diagnostics system 280 are delineated in the specific manner described to help with explaining concepts described herein but such delineation is not meant to be limiting. Further, the system-identification characterization system 200 may include any number of other elements or may be implemented within other systems or contexts than those described.

Figure 3A:
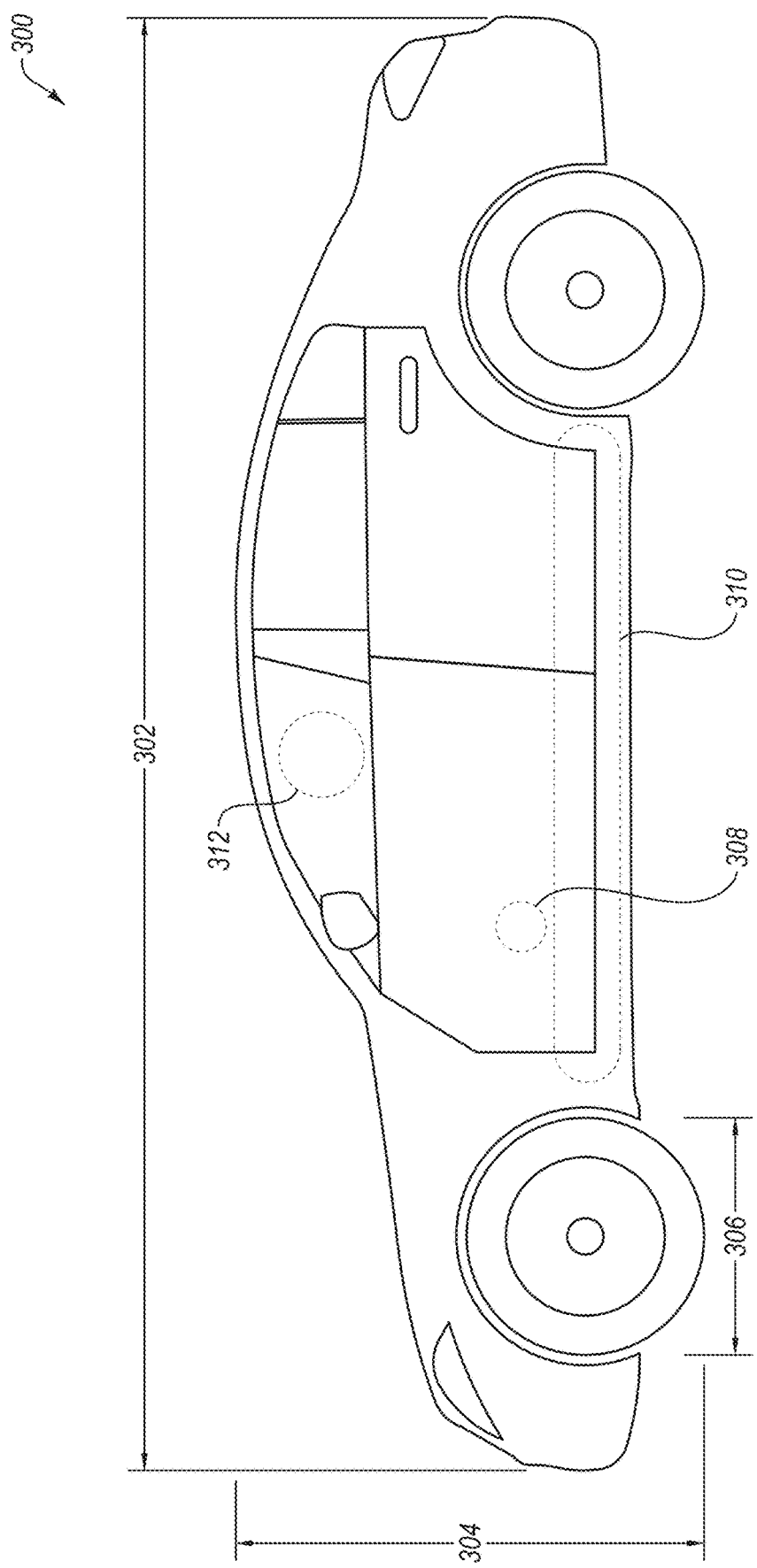
FIGS. 3A-3C illustrate example vehicles that may be characterized by the system-identification characterization system according to one or more embodiments of the present disclosure.
Figure 3B:
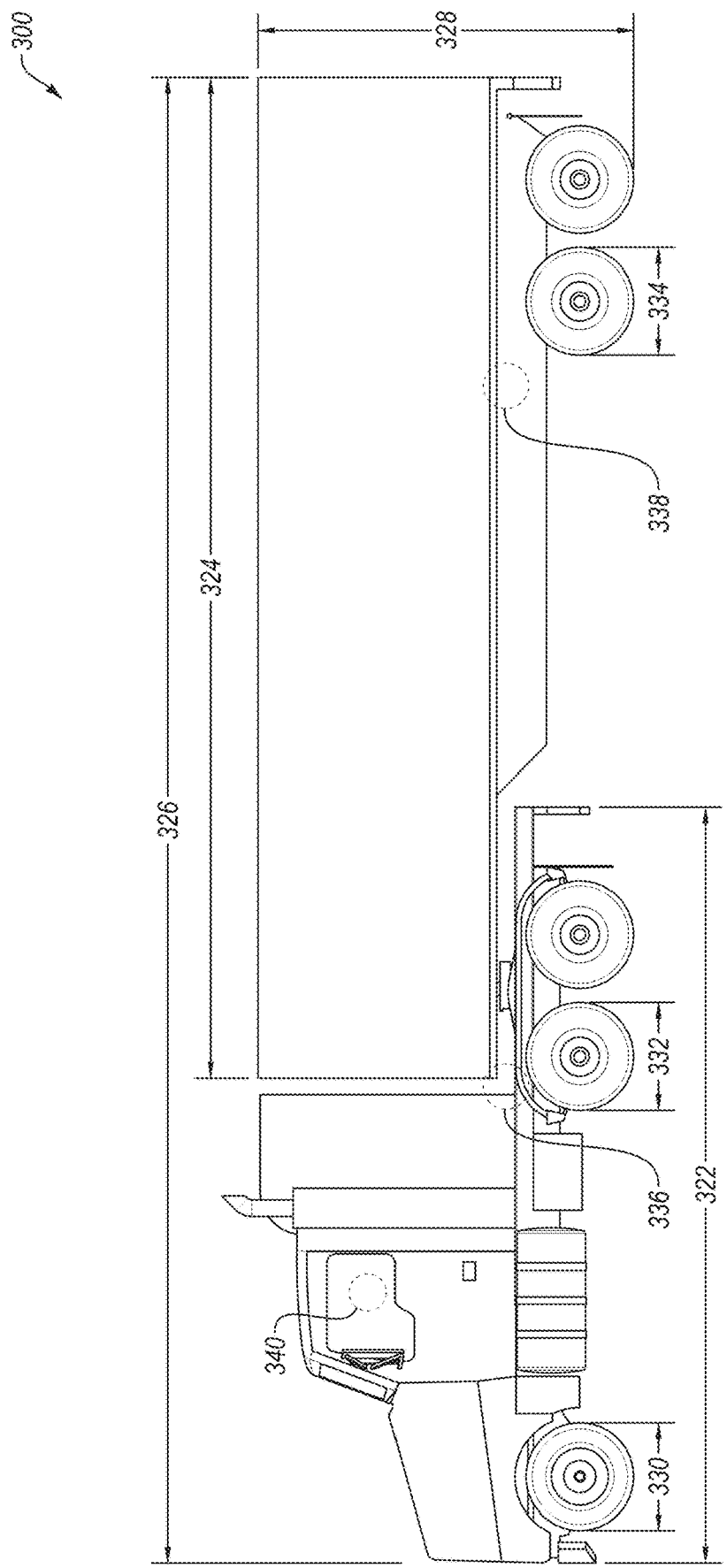
Figure 3C:
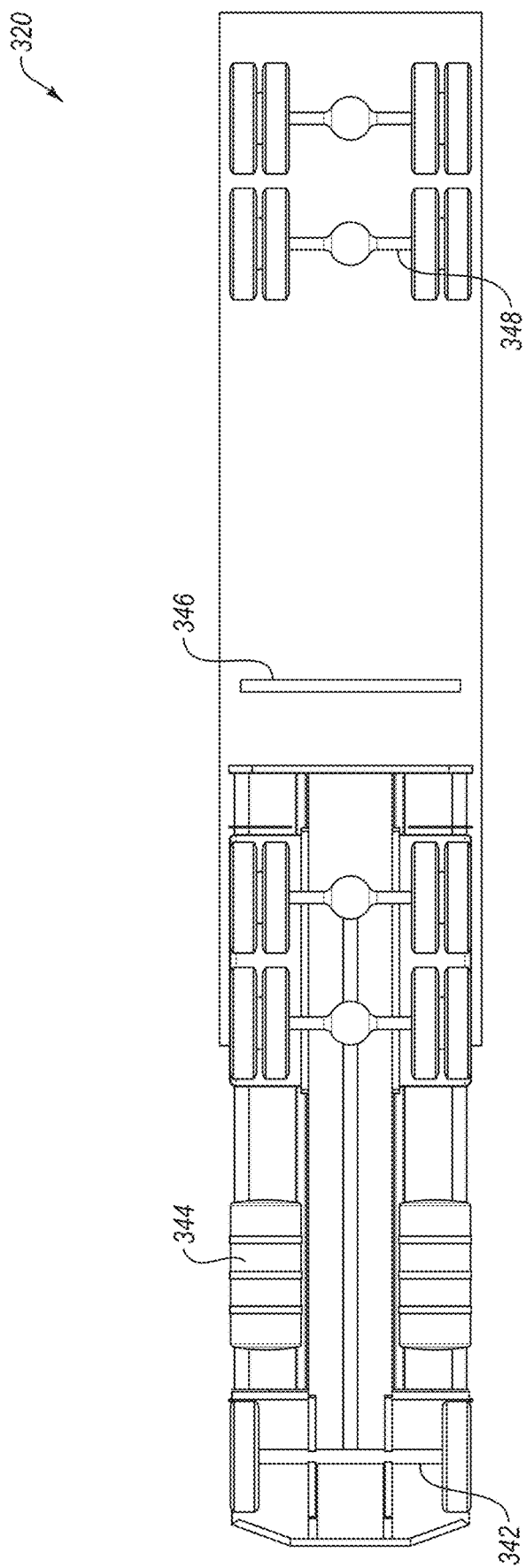

FIGS. 3A-3C illustrate example vehicles that may be characterized by the system-identification characterization system according to one or more embodiments of the present disclosure. FIG. 3A illustrates an example sedan 300 and emphasizes kinematic characteristics of the sedan 300 that may be represented by one or more model parameters according to at least one embodiment of the present disclosure. For example, a vehicle length 302 and/or a vehicle height 304 may be represented as kinematic characteristics of the sedan 300. As an additional or alternative example, a wheel diameter 306, a center of gravity 308, and/or a turning axis 310 of the sedan 300 may provide information relating to a turning radius, a braking distance, a vehicle balance, any other kinematic characteristics relating to the wheels of the sedan 300, or some combination thereof. As an additional or alternative example, a passenger position 312 inside the sedan 300 may influence a weight balance of the sedan 300.

FIG. 3B illustrates a side view of an example eighteen-wheeler 320, and FIG. 3C illustrates a view of the eighteen-wheeler 320 from below in which one or more kinematic characteristics of the eighteen-wheeler 320 may be represented by one or more model parameters according to at least one embodiment of the present disclosure. In some embodiments, some of the kinematic characteristics of the eighteen-wheeler 320 may be categorically the same as or similar to the kinematic characteristics of the sedan 300 with different magnitudes. For example, the eighteen-wheeler 320 may include an overall vehicle length 326, a vehicle height 328, and/or a passenger position 340, which may be respectively measured or otherwise identified in the same or a similar way as the vehicle length 302, the vehicle height 304, and/or the passenger position 340 of the sedan 300. Additionally or alternatively, the kinematic characteristics of the eighteen-wheeler 320 may differ from those of the sedan 300 such that different kinematic characteristics are identified in relation to the eighteen-wheeler 320. For example, the eighteen-wheeler 320 may include a front-car length 322, a cargo length 324, a first wheel diameter 330, a second wheel diameter 332, a third wheel diameter 334, a first center of gravity 336, and/or a second center of gravity 338 as illustrated in FIG. 3B. As an additional or alternative example, the eighteen-wheeler 320 may include a primary wheel axle 342, one or more fuel tanks 344, a support axis 346, and/or one or more secondary wheel axles 348 in which one or more properties of the primary wheel axle 342, the fuel tanks 344, the support axis 346, and/or the secondary wheel axles 348 may be identified as kinematic characteristics.

In some embodiments, one or more of the kinematic characteristics of a given AV may be unique to a type of vehicle associated with the given AV. For example, kinematic characteristics corresponding to the support axis 346 and/or the secondary wheel axles 348 may be present if the given AV is an eighteen-wheeler but may or may not be present if the given AV is a sedan. Based on the presence and/or absence of particular kinematic characteristics, the given AV may be categorized to better facilitate determining what types of kinematic characteristics and/or magnitudes of the kinematic characteristics are relevant to the given AV.

Figure 4:
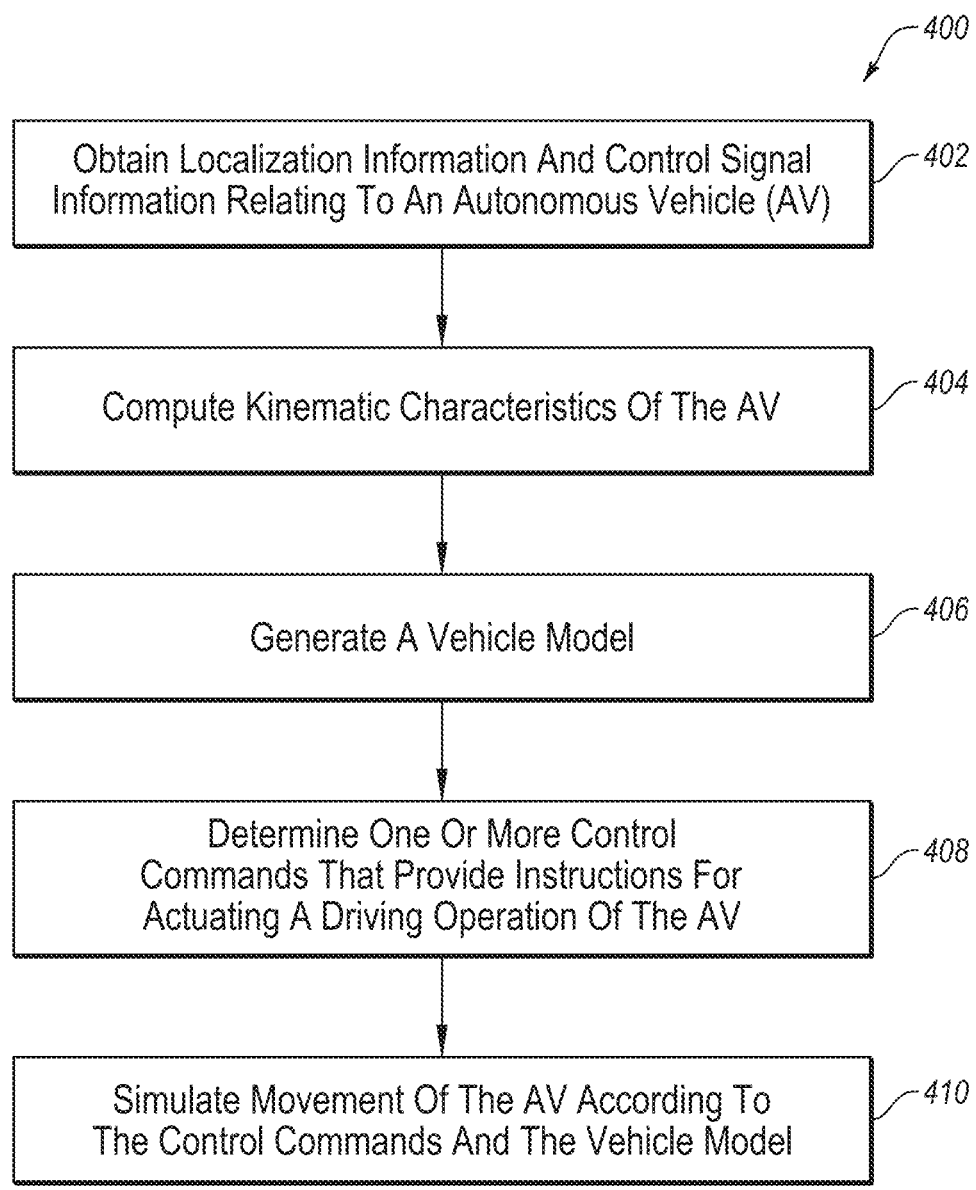
FIG. 4 is a flowchart of an example method of performing vehicle characterization according to at least one embodiment of the present disclosure.

FIG. 4 is a flowchart of an example method 400 of performing vehicle characterization according to at least one embodiment of the present disclosure. The method 400 may be performed by any suitable system, apparatus, or device. For example, the localization system 210, the control system 220, the system identification characterization 230, the simulation system 270, and/or the diagnostics system 280 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where localization information and control signal information relating to a given AV may be obtained. The localization information may include information determined and/or computed by the localization system 210 of the system-identification characterization system 200 of FIG. 2. Additionally or alternatively, the control signal information may include information determined and/or computed by the control system 220 of the system-identification characterization system 200. In some embodiments, the localization information and/or the control signal information may include data collected at particular times and/or represent particular spatial positions relative to the given AV. In some embodiments, obtaining the localization information and/or the control signal information may involve aligning the data with respect to times at which the data was captured and/or organizing the data spatially such that data relating to similar spaces may be aligned. In these and other embodiments, obtaining the localization information and/or the control signal information may include filtering out one or more data points associated with the obtained localization information and/or the obtained control signal information that include sensor noise or inconsistent data points.

At block 404, kinematic characteristics of the given AV may be computed based on the localization information and/or the control signal information. In some embodiments, the kinematic characteristics may include a length of the given AV, a height of the given AV, a center of gravity of the given AV, a passenger position within the given AV, a wheel diameter of a wheel included with the given AV, a tire tread depth of the wheel, a tire thickness of the wheel, a turning radius of the given AV, a turning axis of the given AV, a velocity of the given AV, an acceleration of the given AV, a jerk of the given AV, and/or any other kinematic characteristics of the given AV. Additionally or alternatively, knowing what type of vehicle the given AV is may facilitate identifying more accurate and/or a greater number of kinematic characteristics. Predicting and/or identifying what type of vehicle the given AV is may be facilitated by the kinematic characteristics, and the given AV may be identified as a sedan, a sports utility vehicle, a hatchback, a convertible, a coupe, a pickup truck, an eighteen-wheeler truck, a motorcycle, a van, an emergency services vehicle, a forklift, a crane, a train, a stock chaser, an airplane, an unmanned aerial vehicle, a drone, a robotic vacuum cleaner, and/or any other types of vehicles that may be configured to perform autonomous operations.

At block 406, a vehicle model may be generated based on the kinematic characteristics. In some embodiments, the vehicle model may include a mathematical representation of the given AV that is consistent with observed and/or computed kinematic characteristics of the given AV. In these and other embodiments, the vehicle model may be generated by the model regression subsystem 250 as described in relation to the system-identification characterization system 200 of FIG. 2.

At block 408, one or more control commands that provide instructions for actuating a driving operation of the given AV may be determined based on the vehicle model. The control commands may involve one or more actions that the given AV may take to perform a given driving operation. For example, the control commands may include the actions of driving at a constant speed towards a four-way intersection, decelerating as the given AV approaches the intersection, stopping at the intersection, accelerating and turning towards the left, straightening out the direction in which the given AV is traveling, driving at a constant speed towards a given position, decelerating as the given AV approaches the given position, and stopping at the given position to facilitate corresponding driving operations of driving along a road, stopping at a stop sign, making a left turn, driving towards a destination, and stopping at the destination. In some embodiments, the given AV may validate the accuracy of the vehicle model generated at block 406 and/or the kinematic characteristics computed at block 404 prior to determining the control commands as described in relation to method 500 of FIG. 5.

At block 410, movement of the given AV may be simulated according to the determined control commands and the vehicle model. In some embodiments, the simulation of the movement of the given AV may be performed by the simulation system 270 as described in relation to the system-identification characterization system 200 of FIG. 2. Based on the simulated movement corresponding to the determined control commands and the vehicle model indicating that the control commands determined at block 408 are unlikely to cause problems for the safety of the given AV and/or of objects or people in the vicinity of the given AV, the simulated movements may be performed by the given AV according to actuation of the given AV based on the determined control commands.

In some embodiments, the determined control commands may be used by the given AV as updated control signal information in addition to or as a substitution for the control signal information obtained at block 402 after simulating movement of the given AV based on the determined control commands. Using the determined control commands as input information to the given AV at block 402 may facilitate iterative performance of the method 400 in which more accurate kinematic characteristics, vehicle models, and/or control signals may be determined with each iteration. Additionally or alternatively, the method 400 may be iteratively performed at a fixed refresh rate or at an adaptive refresh rate that changes depending on a need to recompute for a given environment and/or on a need to adaptively recompute one or more of the kinematic characteristics, vehicle models, and/or control signals.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
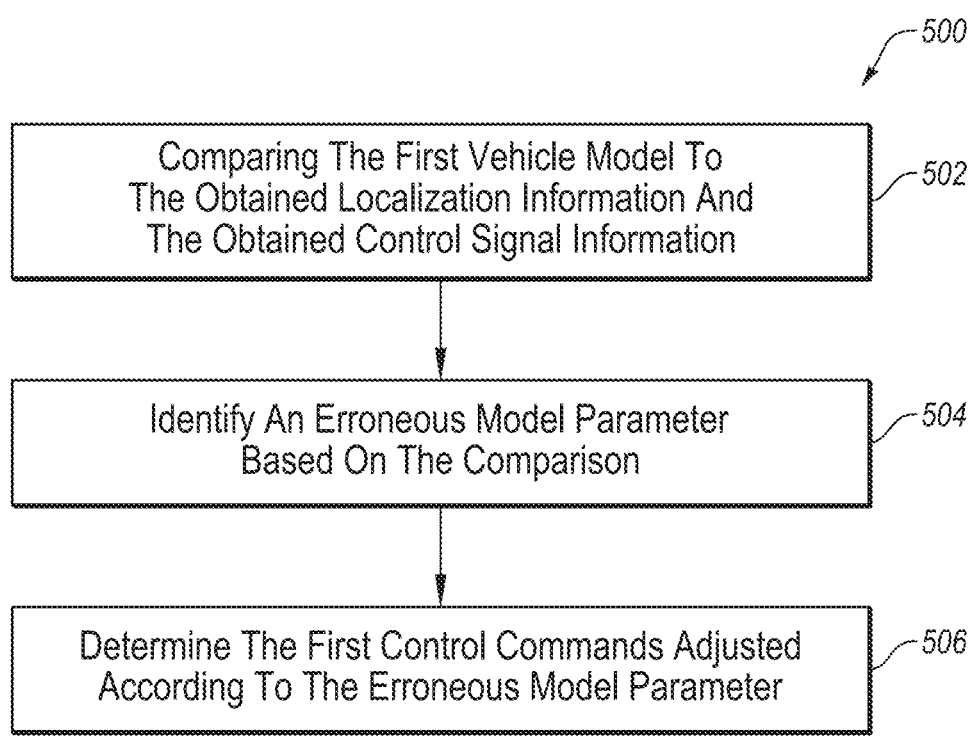
FIG. 5 is a flowchart of an example method of performing a validation check for a vehicle characterization process.

FIG. 5 is a flowchart of an example method 500 of performing a validation check for a vehicle characterization process according to at least one embodiment of the present disclosure. The method 500 may be performed by any suitable system, apparatus, or device. For example, the localization system 210, the control system 220, the system identification characterization 230, the simulation system 270, and/or the diagnostics system 280 of FIG. 2 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation The method 500 may begin at block 502, where a vehicle model may be compared to localization information and/or control signal information. In some embodiments, comparing the vehicle model to the localization information and/or the control signal information may be performed by the validation subsystem 260 as described in relation to the system-identification characterization system 200 of FIG. 2.

At block 504, an erroneous model parameter associated with the first vehicle model may be identified based on the comparison performed at block 502. The erroneous model parameter may be identified based on the comparison between the vehicle model and the obtained localization information and/or control signal information indicating that the vehicle model does not accurately represent the obtained localization information and/or the control signal information within a given threshold. For example, the vehicle model may indicate that the given AV is oriented in a particular direction and/or the given AV is located at a particular location in which the particular direction of orientation and/or the particular location of the given AV are not consistent with the obtained localization information.

At block 506, one or more control commands may be determined in which the control commands are adjusted according to the erroneous model parameter. Responsive to determining that the vehicle model includes one or more erroneous model parameters, it may be determined that a given control command determined based on the erroneous model parameter is not likely to result in accurate and/or safe operation of the given AV. As such, the control commands may be adjusted to account for the erroneous model parameter.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
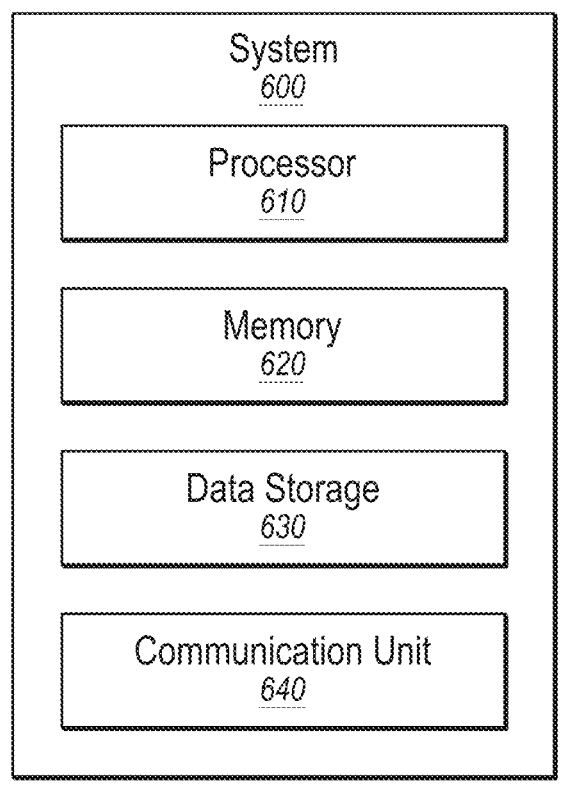
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the system-identification characterization system 200 of FIG. 2 may be implemented as a computing system consistent with the computing system 600, including the control computing subsystem, the system-identification computing subsystem, the simulation computing subsystem, and/or the diagnostics computing subsystem.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform operations associated with the localization system 210, the control system 220, the system identification characterization 230, the simulation system 270, and/or the diagnostics system 280.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may store the localization information, the control commands, the vehicle models, and/or the validation statuses. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining localization information and control signal information relating to an autonomous vehicle (AV);
    computing a plurality of kinematic characteristics of the AV based on the localization information and the control signal information;
    predicting a vehicle type of the AV using the plurality of kinematic characteristics, the predicted vehicle type of the AV indicating properties associated with the AV;
    determining a change in driving conditions that is due to a change in an intrinsic factor directly related to the AV;
    generating a plurality of vehicle models based on the plurality of kinematic characteristics and the change in driving conditions and according to the predicted vehicle type of the AV, a separate vehicle model being generated for each different gear of the AV and each of the vehicle models including a mathematical representation of the AV consistent with the plurality of kinematic characteristics and the predicted vehicle type of the AV and comprising a plurality of model parameters that relate to a gear in which the AV is shifted, an intrinsic property of the AV, motion of the AV, and an orientation of the AV;
    adaptively filtering the plurality of vehicle models by transforming a model parameter of the plurality of vehicle models to generate an additional model parameter;
    determining a control command that provides instructions for actuating a driving operation of the AV, the control command being determined based on the plurality of vehicle models and the additional model parameter, wherein the control command includes at least one of controlling acceleration of the AV or controlling steering of the AV;
    simulating movement of the AV according to the control command and the plurality of vehicle models;
    performing a validation check of the control command based on the simulated movement of the AV, the validation check confirming whether the plurality of vehicle models is consistent with the mathematical representation of the AV and whether the simulated movement of the AV represents movement consistent with the localization information by:
        comparing the plurality of vehicle models to the plurality of kinematic characteristics to determine whether an aspect of the plurality of vehicle models is consistent with the plurality of kinematic characteristics after the simulated movement of the AV, wherein the plurality of vehicle models and the plurality of kinematic characteristics relate to a single AV;
        comparing the simulated movement of the AV to the localization information to determine whether the simulated movement is consistent with the localization information, wherein the simulated movement of the AV and the localization information relate to the single AV; and
    controlling the AV based on the control command responsive to the validation check confirming that the plurality of vehicle models is consistent with the plurality of kinematic characteristics of the AV and that the simulated movement is consistent with the localization information.

2. The method of claim 1, wherein the plurality of kinematic characteristics of the AV comprises a plurality of first kinematic characteristics, the plurality of vehicle models comprises a first plurality of vehicle models, the simulated movement comprises a simulated first movement, and the control command comprises a first control command, the method further comprising:
    obtaining control signals and updated localization information resulting from actuated movement of the AV according to the simulated first movement of the AV;
    computing a plurality of second kinematic characteristics of the AV based on the control signals and the updated localization information;
    generating a second plurality of vehicle models based on the plurality of second kinematic characteristics;
    determining a second control command based on the second plurality of vehicle models; and simulating second movement of the AV according to the second control command and the second plurality of vehicle models.

3. The method of claim 1, wherein performing the validation check of the control command further includes recalculating a mathematical coefficient associated with the aspect of the mathematical representation of the plurality of vehicle models that is not consistent with the plurality of kinematic characteristics of the AV responsive to the validation check failing to confirm that the plurality of vehicle models is consistent with the plurality of kinematic characteristics of the AV.

4. The method of claim 1, wherein obtaining the localization information and the control signal information relating to the AV includes:
aligning the localization information and the control signal information with respect to time of data capture or spatial positioning of data; and
filtering a data point associated with the localization information and the control signal information, wherein the data point includes sensor noise or inconsistent data points.

5. The method of claim 1, wherein the predicted vehicle type corresponding to the AV includes at least one of: a sedan, a sports utility vehicle, a hatchback, a convertible, a coupe, a pickup truck, an eighteen-wheeler truck, a motorcycle, a van, an emergency services vehicle, a forklift, a crane, a train, a stock chaser, an airplane, an unmanned aerial vehicle, a drone, or a robotic vacuum cleaner.

6. The method of claim 1, wherein the plurality of kinematic characteristics include at least two of: a length of the AV, a height of the AV, a center of gravity of the AV, a passenger position within the AV, a wheel diameter of a wheel included with the AV, a tire tread depth of the wheel, a tire thickness of the wheel, a turning radius of the AV, a turning axis of the AV, a velocity of the AV, an acceleration of the AV, or a jerk of the AV.

7. The method of claim 1, further comprising:
receiving a vehicle-agnostic command relative to a desired trajectory of the AV; and
wherein the control command is customized to the AV based on the plurality of kinematic characteristics such that the AV travels along the desired trajectory.

8. The method of claim 1, wherein the intrinsic factor comprises a factor of a component of the AV.

9. One or more non-transitory computer-readable storage media configured to store instructions that, in response to being executed, cause a system to perform operations, the operations comprising:
obtaining localization information and control signal information relating to an autonomous vehicle (AV);
iteratively computing a plurality of kinematic characteristics of the AV based on the localization information and the control signal information, wherein the plurality of kinematic characteristics are iteratively computed at a rate based on at least one of a rate of change of the plurality of kinematic characteristics during a period of time, a number of objects in a vicinity of the AV, or a speed of the AV;
predicting a vehicle type of the AV using the plurality of kinematic characteristics, the predicted vehicle type of the AV indicating properties associated with the AV;
determining a change in driving conditions that is due to a change in an intrinsic factor directly related to the AV;
generating a plurality of vehicle models based on the plurality of kinematic characteristics and the change in driving conditions and according to the predicted vehicle type of the AV, a separate vehicle model being generated for each different gear of the AV and each of the vehicle models including a mathematical representation of the AV consistent with the plurality of kinematic characteristics and the predicted vehicle type of the AV and comprising a plurality of model parameters that relate to at least one of a gear in which the AV is shifted, an intrinsic property of the AV, motion of the AV, and an orientation of the AV;
adaptively filtering the plurality of vehicle models by transforming a model parameter of the plurality of vehicle models to generate an additional model parameter;
determining a control command that provides instructions for actuating a driving operation of the AV, the control command being determined based on the plurality of vehicle models and the additional model parameter, wherein the control command includes at least one of controlling acceleration of the AV or controlling steering of the AV;
simulating movement of the AV according to the control command and the plurality of vehicle models;
performing a validation check of the control command based on the simulated movement of the AV, the validation check confirming whether the plurality of vehicle models is consistent with the mathematical representation of the AV and whether the simulated movement of the AV represents movement consistent with the localization information by:
comparing the plurality of vehicle models to the plurality of kinematic characteristics to determine whether an aspect of the plurality of vehicle models is consistent with the plurality of kinematic characteristics after the simulated movement of the AV, wherein the plurality of vehicle models and the plurality of kinematic characteristics relate to a single AV;
comparing the simulated movement of the AV to the localization information to determine whether the simulated movement is consistent with the localization information, wherein the simulated movement of the AV and the localization information relate to the single AV; and
controlling the AV based on the control command responsive to the validation check confirming that the plurality of vehicle models is consistent with the plurality of kinematic characteristics of the AV and that the simulated movement is consistent with the localization information.

10. The one or more non-transitory computer-readable storage media of claim 9, wherein the plurality of kinematic characteristics of the AV comprises a plurality of first kinematic characteristics, the plurality of vehicle models comprises a first plurality of vehicle models, the control command comprises a first control command, the simulated movement comprises a simulated first movement, and the operations further comprise:
obtaining control signals and updated localization information resulting from actuated movement of the AV according to the simulated first movement of the AV;
computing a plurality of second kinematic characteristics of the AV based on the control signals and the updated localization information;
generating a second plurality of vehicle models based on the plurality of second kinematic characteristics;
determining a second control command based on the second plurality of vehicle models; and simulating second movement of the AV according to the second control command and the second plurality of vehicle models.

11. The one or more non-transitory computer-readable storage media of claim 9, wherein performing the validation check of the control command further includes recalculating a mathematical coefficient associated with the aspect of the mathematical representation of the plurality of vehicle models that is not consistent with the plurality of kinematic characteristics of the AV responsive to the validation check failing to confirm that the plurality of vehicle models is consistent with the plurality of kinematic characteristics of the AV.

12. The one or more non-transitory computer-readable storage media of claim 9, wherein obtaining the localization information and the control signal information relating to the AV includes:
   aligning the localization information and the control signal information with respect to time of data capture or spatial positioning of data; and
   filtering a data point associated with the localization information and the control signal information, wherein the data point includes sensor noise or inconsistent data points.

13. The one or more non-transitory computer-readable storage media of claim 9, wherein the operations further comprise:
   receiving a vehicle-agnostic command relative to a desired trajectory of the AV; and
   wherein the control command is customized to the AV based on the plurality of kinematic characteristics such that the AV travels along the desired trajectory.

14. A system, comprising:
   one or more processors; and
   one or more non-transitory computer-readable storage media configured to store instructions that, in response to being executed, cause the system to perform operations, the operations comprising:
      obtaining localization information and control signal information relating to an autonomous vehicle (AV);
      interpolating a data point based on localization information and the control signal information;
      computing a plurality of kinematic characteristics of the AV based on the localization information and the control signal information;
      predicting a vehicle type of the AV using the plurality of kinematic characteristics, the predicted vehicle type of the AV indicating properties associated with the AV;
      determining a change in driving conditions that is due to a change in an intrinsic factor directly related to the AV;
      generating a plurality of vehicle models based on the plurality of kinematic characteristics, the interpolated data point, and the change in driving conditions and according to the predicted vehicle type of the AV, a separate vehicle model being generated for each different gear of the AV and each of the vehicle models including a mathematical representation of the AV consistent with the plurality of kinematic characteristics and the predicted vehicle type of the AV and comprising a plurality of model parameters that relate to a gear in which the AV is shifted, an intrinsic property of the AV, motion of the AV, and an orientation of the AV;
      adaptively filtering the plurality of vehicle models by transforming a model parameter of the plurality of vehicle models to generate an additional model parameter;
      determining a control command that provides instructions for actuating a driving operation of the AV, the control command being determined based on the plurality of vehicle models and the additional model parameter, wherein the control command includes at least one of controlling acceleration of the AV or controlling steering of the AV;
      simulating movement of the AV according to the control command and the plurality of vehicle models;
      performing a validation check of the control command based on the simulated movement of the AV, the validation check confirming whether the plurality of vehicle models is consistent with the mathematical representation of the AV and whether the simulated movement of the AV represents movement consistent with the localization information by:
         comparing the plurality of vehicle models to the plurality of kinematic characteristics to determine whether an aspect of the plurality of vehicle models is consistent with the plurality of kinematic characteristics after the simulated movement of the AV, wherein the plurality of vehicle models and the plurality of kinematic characteristics relate to a single AV;
         comparing the simulated movement of the AV to the localization information to determine whether the simulated movement is consistent with the localization information, wherein the simulated movement of the AV and the localization information relate to the single AV; and
      controlling the AV based on the control command responsive to the validation check confirming that the plurality of vehicle models is consistent with the plurality of kinematic characteristics of the AV and that the simulated movement is consistent with the localization information.

15. The system of claim 14, wherein the plurality of kinematic characteristics of the AV comprises a plurality of first kinematic characteristics, the plurality of vehicle models comprises a first plurality of vehicle models, the control command comprises a first control command, the simulated movement comprises a simulated first movement, and the operations further comprise:
   obtaining control signals and updated localization information resulting from actuated movement of the AV according to the simulated first movement of the AV;
   computing a plurality of second kinematic characteristics of the AV based on the control signals and the updated localization information;
   generating a second plurality of vehicle models based on the plurality of second kinematic characteristics;
   determining a second control command based on the second plurality of vehicle models; and
   simulating second movement of the AV according to the second control command and the second plurality of vehicle models.

16. The system of claim 14, wherein performing the validation check of the control command further includes recalculating a mathematical coefficient associated with the aspect of the mathematical representation of the plurality of vehicle models that is not consistent with the plurality of kinematic characteristics of the AV responsive to the validation check failing to confirm that the plurality of vehicle models is consistent with the plurality of kinematic characteristics of the AV.

17. The system of claim 14, wherein obtaining the localization information and the control signal information relating to the AV includes:
   aligning the localization information and the control signal information with respect to time of data capture or spatial positioning of data; and
   filtering a data point associated with the localization information and the control signal information, wherein the data point includes sensor noise or inconsistent data points.

18. The system of claim 14, wherein the operations further comprise:
   receiving a vehicle-agnostic command relative to a desired trajectory of the AV; and
   wherein the control command is customized to the AV based on the plurality of kinematic characteristics such that the AV travels along the desired trajectory.

* * * * *